Sept. 29, 1959 C. H. REDD 2,906,129
WIPER OPERATING MECHANISM
Filed Feb. 27, 1957
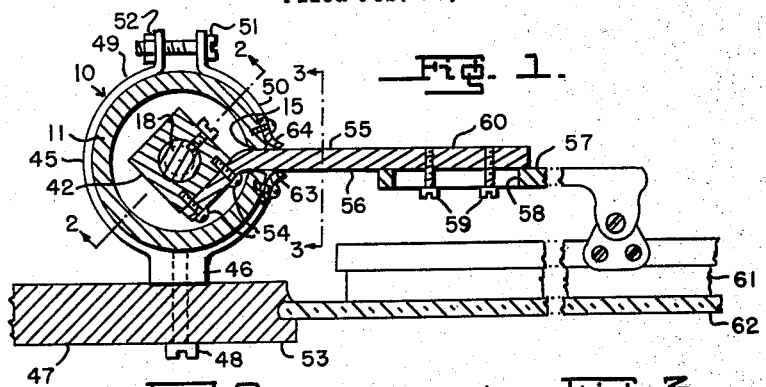
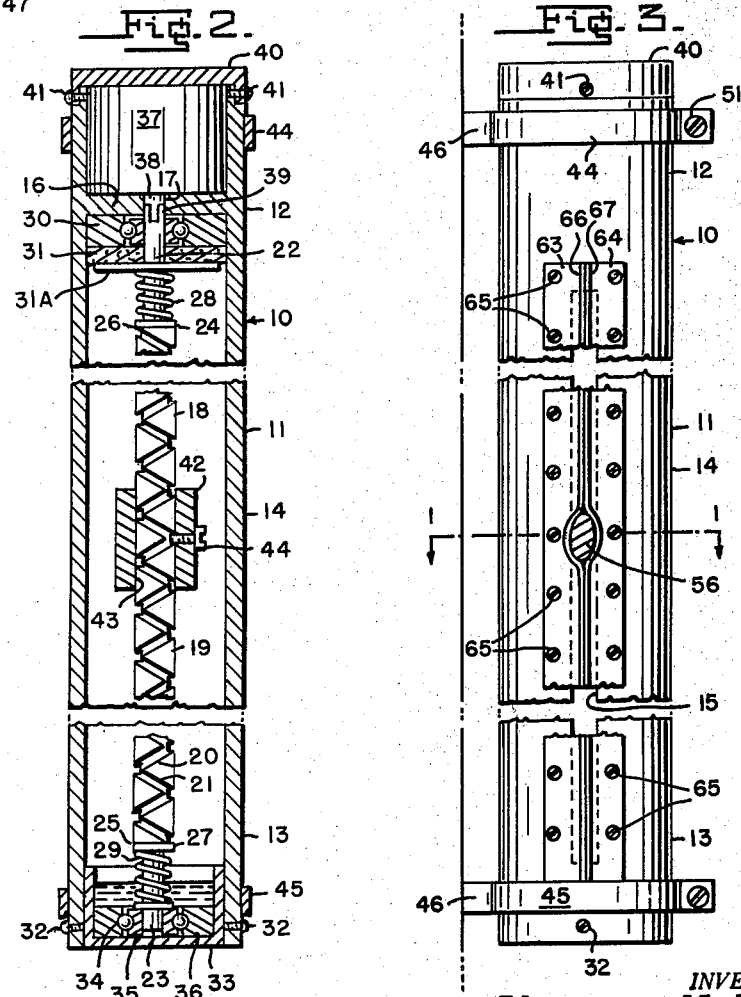
INVENTOR.
Clarence H. Redd
BY
Franklin W. Durgin
AGENT.

United States Patent Office 2,906,129
Patented Sept. 29, 1959

2,906,129

WIPER OPERATING MECHANISM

Clarence H. Redd, Lufkin, Tex.

Application February 27, 1957, Serial No. 642,874

1 Claim. (Cl. 74—57)

The present invention relates to improvements in windshield wipers and more specifically to mechanism particularly well adapted, but not necessarily restricted, to impart vertical reciprocatory movement to a wiper blade of the type used on the windshields of heavy vehicles such as cranes, locomotives, large buses and trucks.

The usual automobile type windshield wiper operating over an annular segmental area does not clean enough of the glass to enable the operators of heavy construction and transportation vehicles to see through the entire glass area with maximum safety.

An important object of this invention is to provide a windshield wiper that will clean the entire glass area of the rectangular plate glass windshield usually provided on heavy vehicles of the character just described.

Another object of the invention is the provision of windshield wiper mechanism that is adapted for mounting on either side of the windshield frame and which may be applied to windshields of various widths.

A further object is to provide operating mechanism for a windshield wiper blade of any one of a number of different lengths and which will clean the entire surface of a glass equal in width to the length of the wiper blade.

A further object of the invention is to provide a wiper mechanism of the character described having improved lubricating means and improved means for protecting the mechanism from moisture, dust and the like.

Other objects and advantages of the invention will become apparent during the course of the following detailed description taken in connection with the accompanying drawing forming a part of this specification and in which drawing, Fig. 1 is a fragmentary cross sectional view of the wiper mechanism and windshield, the view being taken substantially on the line 1—1 of Fig. 3.

Fig. 2 is a central vertical longitudinal sectional view of the wiper mechanism, the view being taken substantially on the line 2—2 of Fig. 1.

Fig. 3 is a side elevational view of the wiper housing and showing the wiper arm in transverse section, the view being taken on the line 3—3 looking in the direction of the arrows in Fig. 1.

In the drawing which for the purpose of illustration shows only a preferred embodiment of the invention and wherein similar reference characters denote corresponding parts through the views, the numeral 10 generally designates the windshield wiper mechanism which comprises a normally vertical cylindrical tubular housing 11 having upper and lower end portions 12, 13 and an intermediate portion 14 provided with an elongate longitudinal slot 15 therein.

In the housing 11 at its upper end portion 12 there is a stationary transverse partition 16 having a central shaft opening 17 therein. Below the partition 16 and disposed coaxially within the cylindrical housing 11 is a driven shaft 18 having an intermediate portion 19 provided with right and left hand threads 20, 21 forming a conventional diamond design and reduced upper and lower end portions 22, 23 separated from the intermediate portion by annular shoulders 24, 25 in whose surfaces the right and left hand threads 20, 21 terminate. Mounted on said upper and lower end portions 22, 23 are upper and lower washers 26, 27 respectively that normally contact said annular shoulders 24, 25 and are urged thereagainst by expansion coil springs 28, 29 that encircle the reduced end portions 22, 23 of the shaft 18. Fitted in the upper portion 12 of the housing 11 subjacent the transvese partition 16 is an anti-friction bearing 30 preferably of the type which comprises a series of balls disposed between inner and outer races and this bearing 30 is equipped with an annular grease packing 31 that is held against the upper bearing 30 through pressure of the expansion coil spring 28 acting on a pressure disk 31A.

Removably secured in the lower end portion 13 of the housing 11 as by screws 32 is a cup 33 containing a lower bearing 34 for the lower end portion 23 of the shaft and this bearing 34 is preferably of the type which comprises a series of balls disposed between inner and outer races 35, 36. The lower expansion coil spring 29 rides on the inner race 35 and thus maintains upward pressure on the shaft 18.

Removably mounted in the upper end portion 12 of the housing above the transverse partition 16 is a fractional horse power electric motor 37 having a downwardly disposed drive shaft 38 that is longitudinally releasably connected to the upper end portion 22 of the shaft as by a tongue and groove joint 39 in the shaft opening 17 of the partition. The top end 12 of the housing is provided with a cap 40 that is held in place over the motor 37 as by screws 41.

Traveling on the oppositely threaded intermediate portion 19 of the shaft is a nut 42 having an elongate bore 43 and provided with a cap screw 44 that projects into the bore 43 and engages with threads 20, 21 on the shaft whereby rotation of the threaded shaft 18 relative to the nut 42 imparts vertical reciprocatory movement to the nut. The cup 33 serves as an oil chamber at the lower limit of travel of said vertically reciprocable nut 42 and thus the nut carries a quantity of oil up the oppositely threaded shaft 18 each time the mechanism goes through a cycle of operation.

Upper and lower brackets 44, 45 each include a base portion 46 adapted to be fastened to the windshield frame 47 as by a screw 48 and arcuate strap portions 49, 50 adapted to be drawn into clamping engagement with the cylindrical housing as by a screw 51 having threaded adjustment relative to a nut 52. These brackets 44, 45 permit bodily adjustment of the housing 11 so that the longitudinal slot 15 therein may be disposed at either side of the brackets. In the example shown in Fig. 1 the brackets are mounted on the left side 53 of the windshield frame 47 and the slot 15 faces toward the right but the position of parts can be reversed so that the mechanism may be mounted on the right side of the windshield frame if desired.

Securely affixed to the traveler nut 42 as by cap screws 54 is one section 55 of an adjustable and reversible wiper arm 56 that extends from the housing through the longitudinal slot 15. The other section 57 of the wiper arm is provided with an elongate opening 58 receiving cap screws 59 which serve to releasably fasten the two sections of the wiper arm 56 together in overlapping relation and permit adjustment of the arm 56 to any one of a plurality of lengths. These two sections 55, 57 of the wiper arm may also be differently fastened together in overlapping relation by engagement of section 57 with the side 60 of the arm section 55 opposite from that engaged in Fig. 1 and by so reversing these parts the wiper blade 61 is permitted to contact the windshield glass 62 when the wiper mechanism is mounted on the right side of the windshield frame 47.

In order to prevent foreign matter such as dust or raindrops from entering the housing 11 through the longitudinal slot 15, a pair of flexible waterproof strips 63, 64 formed of sheet rubber or the like are secured as by screws 65 along the marginal edges of the slot 15 so that their adjacent edges 66, 67 abut and form a closure for the slot while at the same time permitting the wiper arm 56 to move up and down in the slot 15 without appreciable interference. The wiper arm 56 may be faired to an oval shape in cross section so as to enable the flexible strips 63, 64 to more snugly contact the surface of the wiper arm 56 and to reduce friction to a minimum.

Various changes may be made in the form of invention herein shown and described without departing from the spirit of the invention or the scope of the following claim.

I claim:

In mechanism of the character described, a normally vertical cylindrical tubular housing having an upper and a lower end portion and an intermediate portion provided with an elongate longitudinal slot therein, a transverse partition in the housing at its upper end portion provided with a shaft opening, a shaft in the housing having an oppositely threaded intermediate portion and reduced upper and lower end portions, an upper and a lower washer on said upper and lower end portions respectively, an upper bearing for the upper end portion of the shaft, said upper bearing being fitted in the housing subjacent said partition, an annular packing fitted in the housing subjacent the upper bearing, a compression disc subjacent the packing, a lower bearing for the lower end portion of the shaft, coil springs one on the upper end portion of said shaft between the compression disc and washer thus compressing the packing against the upper bearing and another on the lower end portion of said shaft between the lower bearing and washer, a motor removably enclosed within the upper end portion of the housing above said partition, means extending into the shaft opening in said partition and connecting the motor and the upper end portion of said shaft, a nut engaging said oppositely threaded shaft portion whereby rotation of the threaded portion relative to the nut imparts vertical reciprocatory movement to the nut, a cup removably secured in the lower end portion of the housing, said cup holding said lower bearing and defining an oil chamber at the lower limit of travel of said vertically reciprocable nut, annular constrictive bracket means in which said cylindrical housing is disposed for rotation, said bracket means for releasably vertically securing said housing in either one of two diametrically opposed positions wherein the location of the housing slot may be reversed, an arm including overlapping sections one affixed to said nut and extending through said slot and another for carrying a wiper or the like, and means releasably adjustably joining said overlapping sections whereby said mechanism is adapted for right or left hand mounting and operation of the wiper or the like.

References Cited in the file of this patent

UNITED STATES PATENTS

| | | |
|---|---|---|
| 1,199,509 | Tensnow | Sept. 26, 1916 |
| 1,484,251 | Brennon | Feb. 19, 1924 |
| 1,656,921 | Monnot | Jan. 24, 1928 |
| 1,706,125 | Martin | Mar. 19, 1929 |
| 1,723,189 | Martin | Aug. 6, 1929 |
| 1,743,713 | Geremia | Jan. 14, 1930 |
| 2,101,773 | Bowen | Dec. 7, 1937 |